Patented Aug. 11, 1953

2,648,648

UNITED STATES PATENT OFFICE 2,648,648

HIGH ACRYLONITRILE POLYMER SOLUTIONS

George W. Stanton, Walnut Creek, Theodore B. Lefferdink, Concord, and Clyde W. Davis, Antioch, Calif., assignors to The Dow Chemical Company, Midland, Mich., a corporation of Delaware No Drawing. Application May 28, 1951, Serial No. 228,753

5 Claims. (Cl. 260—29.6)

This invention relates to compositions of matter especially adapted for use in spinning fine fibers or like structures, comprising solutions of polymers containing 85 per cent or more of acrylonitrile. It relates specifically to spinnable solutions of such polymers in concentrated aqueous salt solutions, and is further concerned with a method whereby such solutions may be prepared.

It has been reported by Rein, in U. S. 2,140,921 and British 459,596, that various polymeric vinyl compounds may be dissolved, often at temperatures near 100° C., in concentrated aqueous solutions of certain salts. Kropa has shown, in U. S. 2,356,767, that acrylonitrile may be polymerized to form spinnable solutions in aqueous zinc halides of at least 65 per cent concentration. Numerous more recent publications, typical of which are Merner, U. S. 2,404,723; Dickey et al., U. S. 2,487,859; and British specifications 583,939 and 584,548, have shown that it is virtually impossible to spin useful fibers from the aqueous salt solutions of the prior art. This has been confirmed, and the filamentary products spun by means of standard techniques from solutions in the suggested single salts have been found to be opaque, brittle and full of voids.

The last named difficulty may be overcome to a large extent in the manner described, by two of the present inventors and another, in concurrently filed application Serial No. 228,751, by using as the spinning dope a solution of the high acrylonitrile polymer in an aqueous solution of generally from 30 to 50 per cent concentration of a "solvent" salt and a lesser amount, from 5 to 25 per cent, of a "non-solvent" salt, the aggregate amount of the two types of salts being at least 55 per cent by weight in water. (The two types of salts are defined more fully hereinafter.) Fibers made from such solutions are clear, tough, and substantially free from voids. The solutions of the polymer in such salts may be made by polymerizing the acrylonitrile, and any monoethylenically unsaturated comonomer, in the mixed salt solution, as described in our concurrently filed application, Serial No. 228,752.

It has now been found that a further and substantial improvement may be realized in the art of spinnable solutions containing polymers rich in acrylonitrile, whether those solutions are made from aqueous solutions of single salts, as taught by Rein or Kropa, or from the solutions of mixed solvent and non-solvent salts mentioned above. The improvement of the present invention consists in modifying one of the above-suggested aqueous saline solutions of a polymer rich in acrylonitrile by incorporating in such solution from about 5 to about 30 per cent, based on the weight of polymer present, of an organic peptizing agent for polyacrylonitrile. Numerous such agents are known, and the only special requirement is that the peptizing agent be soluble in the presence of the polymer in the salt solution employed. Extensive lists of the useful agents are found in U. S. Patents 2,404,713–2,404,728, inclusive. Many of these compounds contain amide, nitrile, nitro, or sulfone groups, and illustrative examples are dimethylformamide, acetonitrile, succinonitrile, nitromethane, dimethyl sulfone, and tetramethylene cyclic sulfone. Other typical peptizing agents useful for the present purpose include the lactones and lactams of Italian Patents 399,311 and 399,312 as well as such latent peptizers as paratoluenesulfonamide, phenol, 4,4'-dihydroxydiphenylmethane, thymol, para-tertiarybutylphenol, and the like.

The presence of an organic peptizing agent in the aqueous salt solution of polymer accomplishes several desirable results. A typical peptizing agent normally lowers the molecular weight of the polymer formed under a given set of polymerization conditions. It reduces the viscosity, and hence simplifies the spinning operation. It permits the use of higher concentrations of polymer in the solution. It permits the use of higher molecular weight polymers at practical spinning concentrations. The presence of the organic peptizing agent during the wet spinning of the solution into a coagulating bath controls the time required for coagulation and aids in forming high tenacity fibers free from voids. The solutions of the present invention, when spun into a coagulating bath, may be stretched to a greater extent after initial coagulation than a fiber spun from an unmodified aqueous salt solution. Hence, the new solutions may be spun from a given spinneret to give finer fibers than are obtainable from straight salt solutions of the same polymer, or they may be spun through larger spinnerets (with the accompanying advantage of lower applied pressure) and yield fibers of the same denier as are made from the straight salt solution using a finer spinneret.

The new and improved solutions may be made by dissolving a previously prepared acrylonitrile polymer in the aqueous solution of the salt or salts, and stirring the peptizing agent into the solution. The solutions may also be prepared by swelling the polymer particles by contact with the peptizing agent until from 5 to 30 per cent of such agent has been absorbed, and then dissolving the so-treated particles in the brine. It is generally more advantageous, however, to polymerize the acrylonitrile monomer, together with a small amount of comonomer, if desired, in a concentrated aqueous salt solution capable of dissolving the desired polymer, said salt solution containing from 5 to 30 per cent, based on the weight of monomer introduced, of one of the defined organic peptizing agents for the polymer. The tendency to form visible gels during polymerization is substantially eliminated, and the polymer solution has a somewhat lower viscosity when such agents are present throughout the polymerization than when the reaction is carried out in salt solutions which do not contain these organic modifiers. Surprisingly, the phenolic compounds containing a single hydroxyl group per benzene ring are normally thought of as polymerization inhibitors, yet, in the aqueous salt medium of the present invention, when present in amounts ranging upward from about 5 per cent of the weight of monomer, they accelerate the polymerization of acrylonitrile.

The "solvent" salts whose solutions may be used in the practice of the invention are those whose anions are at least as high in the following table as their cations. "Non-solvent" salts are those whose anions are lower in the table than their cations, and these may be mixed with solvent salts to form useful solutions within a certain range of proportions. Generally, when using a mixture of solvent and non-solvent salts, these should be in the previously stated ratio of 30 to 50 per cent of solvent salt and a lesser amount of 5 to 25 per cent of non-solvent salt, at an aggregate concentration of 55 per cent or higher.

TABLE

*Lyotropic Series for Polyacrylonitrile*

| Cations in Increasing Order of Effectiveness | Anions in Decreasing Order of Effectiveness |
|---|---|
| $K^+$ | |
| $Fe^{+++}$ | |
| $Pb^{++}$ | |
| $NH_4^+$ | |
| $Cd^{++}$ | $SCN^-$ |
| $Al^{+++}$ | |
| $Na^+$ | $I^-$ |
| $Ba^{++}$ | |
| $Ca^{++}$ | |
| $Li^+$ | $Br^-$ |
| $Mg^{++}$ | |
| $Ga^{+++}$ | |
| $Sb^{+++}$ | |
| $In^{+++}$ | $Cl^-$ |
| $Tl^{+++}$ | |
| $Sn^{++++}$ | |
| $Zn^{++}$ | |
| $Ag^+$ | |
| $Ni^{++}$ | $NO_3^-$ |
| $Co^{++}$ | |
| $Mn^{++}$ | $SO_4^-$ |

The following examples illustrate the present invention.

In the table which follows appears the name of each of several peptizing agents for polyacrylonitrile, each of which was added to a salt brine having the stated composition. The amount of peptizing agent was 10 per cent of the weight of monomeric acrylonitrile which was polymerized in the modified brine at 30° C. Each polymer was spun through a spinneret into a coagulant bath and was stretched under standard conditions. The properties of the resulting fine fibers are reported.

| Salt Composition | | Volume salt solution per volume monomer | Peptizing Agent | Viscosity Polymer solution, poises | Fiber Properties | |
|---|---|---|---|---|---|---|
| Percent $ZnCl_2$ | Percent $CaCl_2$ | | | | Denier | Tenacity, g./den. |
| 34.6 | 27.2 | 4 | Dimethyl formamide | 2,880 | 2.8 | 8.3 |
| 34.6 | 27.2 | 5 | Acetonitrile | 960 | 5.3 | 2.3 |
| 34.6 | 27.2 | 4 | Dimethyl cyanamide | 6,400 | 2.0 | 3.4 |
| 34.6 | 27.2 | 5 | do | 1,344 | 2.8 | 3.4 |
| 34.6 | 27.2 | 4 | p-toluene sulfonamide | 3,840 | 5.3 | 2.9 |
| 34.6 | 27.2 | 5 | Di-(2-Chloroethyl formal | 2,048 | 5.3 | 3.2 |
| 34.6 | 27.2 | 3 | do | 9,472 | 2.8 | 4.2 |
| 34.6 | 27.2 | 4 | Blank | 4,480 | | |
| 34.6 | 27.2 | 5 | do | 1,280 | | |
| 34.6 | 27.2 | 3 | do | 16,640 | 4 | 3.3 |

| Salt Composition | | Wt. percent acrylonitrile | Peptizing Agent | Viscosity Polymer solution, poises |
|---|---|---|---|---|
| Percent $ZnCl_2$ | Percent $CaCl_2$ | | | |
| 47.2 | 18.2 | 8.3 | Dimethyl formamide | 3,840 |
| 47.2 | 18.2 | 8.3 | Phenol | 750 |
| 47.2 | 18.2 | 8.3 | p-toluene sulfonamide | 3,840 |
| 47.2 | 18.2 | 8.3 | Thymol | 1,408 |
| 34.6 | 27.2 | 8.56 | Dimethyl formamide | 1,600 |
| 34.6 | 27.2 | 10.28 | do | 3,712 |
| 34.6 | 27.2 | 8.56 | p-toluene sulfonamide | 960 |
| 60 | | 7.14 | Blank | 4,480 |
| 34.6 | 27.2 | 8.56 | do | 1,280 |
| 34.6 | 27.2 | 10.57 | do | 4,480 |

It was observed that each of the non-phenolic modifiers listed above improves the ability of the fiber to be hot-stretched, and that the phenolic compounds accelerated the polymerization rate several-fold. Many of the compounds caused the polymer solutions to exhibit somewhat lower viscosities than comparable solutions from which the peptizing agent was omitted. The absence of gels, in the solutions containing the peptizing agents, was noted.

In a carefully controlled spinning operation, a comparison was made between a saline solution of polyacrylonitrile containing 20 per cent as much dimethyl formamide as polymer and similar solutions containing no dimethyl formamide. Each solution was spun through 3-mil spinneret orifices into water, which served as the coagulant. The filaments were removed from the water after one-half inch travel therein, and were cold stretched to the maximum possible extent without rupture. They were then passed through water at 38° C. for 20 seconds without application of stretching tension, and were stretched the maximum amount possible without rupture at a temperature of about 100° C. The spun fibers were dried and spooled. The ones made from the solution containing the peptizing agent had a denier of 4.3 and a tenacity of 4.0 grams per denier. The ones made from the solution containing no peptizing agent could not be stretched to the same extent under the conditions employed, and had larger deniers of 6 to 13, and lower tenacities of 2.5 to 1.9 grams per denier.

The invention is not limited in its application to the homopolymer of acrylonitrile, but is equally applicable to, and of equal advantage with the copolymers containing at least 85 per cent of acrylonitrile in the polymer molecule, the balance being another vinyl compound.

We claim:

1. A composition of matter, the essential constituents of which are a polymer of acrylonitrile containing at least 85 per cent by weight of acrylonitrile in the polymer molecule and from 5 to 30 per cent of its weight of an organic peptizing agent therefor, in an aqueous saline solution capable of dissolving polyacrylonitrile the principal saline constituent in said solution being one whose anion is at least as high as its cation in the appended lyotropic series of solvents for the polymer:

| Cations in Increasing Order of Effectiveness | Anions in Decreasing Order of Effectiveness |
|---|---|
| $K^+$ | |
| $Fe^{+++}$ | |
| $Pb^{++}$ | |
| $NH_4^+$ | |
| $Cd^{++}$ | $SCN^-$ |
| $Al^{+++}$ | |
| $Na^+$ | $I^-$ |
| $Ba^{++}$ | |
| $Ca^{++}$ | |
| $Li^+$ | $Br^-$ |
| $Mg^{++}$ | |
| $Ga^{+++}$ | |
| $Sb^{+++}$ | |
| $In^{+++}$ | $Cl^-$ |
| $Tl^{+++}$ | |
| $Sn^{++++}$ | |
| $Zn^{++}$ | |
| $Ag^+$ | |
| $Ni^{++}$ | $NO_3^-$ |
| $Co^{++}$ | |
| $Mn^{++}$ | |
| | $SO_4^-$ |

2. A composition as claimed in claim 1, wherein the peptizing agent is dimethyl formamide.

3. A composition as claimed in claim 1, wherein the peptizing agent is paratoluenesulfonamide.

4. A composition as claimed in claim 1, wherein the peptizing agent is acetonitrile.

5. A composition as claimed in claim 1, wherein the aqueous saline solution contains from 30 to 50 per cent by weight of a salt whose anion is at least as high in the lyotropic series of solvents for the polymer as its cation and a lesser amount, from 5 to 25 per cent, of a salt whose anion is lower in said series than its cation, the aggregate concentration of the two types of salts being at least 55 per cent.

GEORGE W. STANTON.
THEODORE B. LEFFERDINK.
CLYDE W. DAVIS.

References Cited in the file of this patent

UNITED STATES PATENTS

| Number | Name | Date |
|---|---|---|
| 2,425,191 | Kropa | Aug. 5, 1947 |
| 2,528,710 | Richards | Nov. 7, 1950 |